(No Model.)
W. P. KOOKOGEY.
METHOD OF MAKING SECONDARY BATTERY PLATES.
No. 432,672. Patented July 22, 1890.
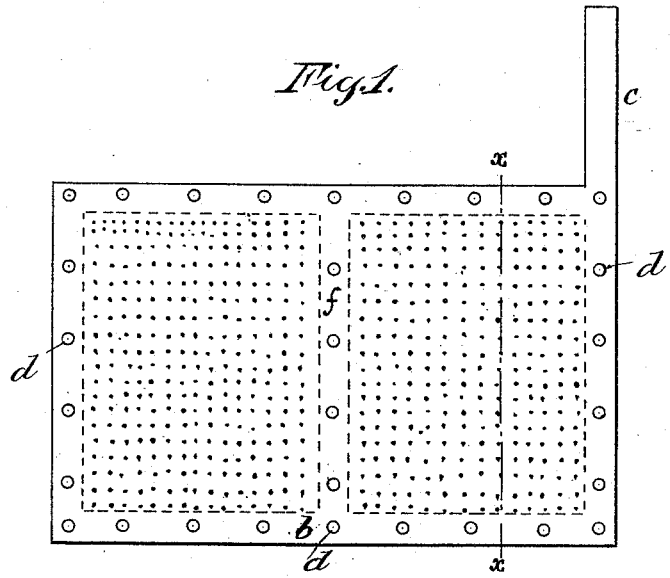
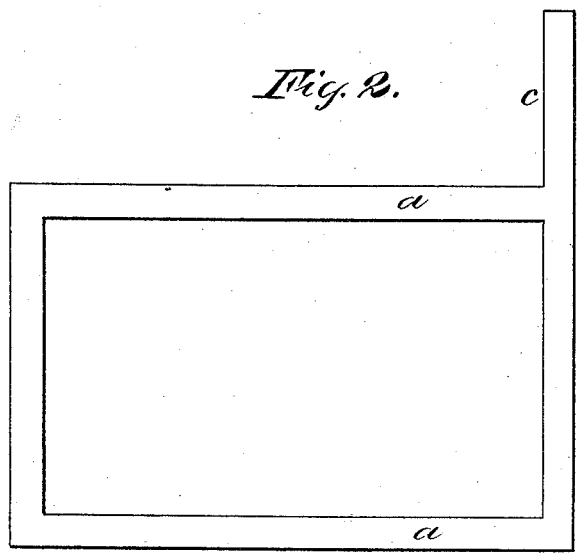 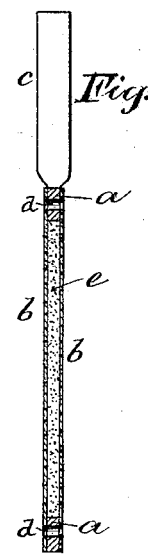
Witnesses:
Charles M. Desmond
Arthur E. Walradt
Inventor:
William P. Kookogey
by Salter S. Clark
his attorney

UNITED STATES PATENT OFFICE.

WILLIAM P. KOOKOGEY, OF BROOKLYN, NEW YORK, ASSIGNOR TO THE KOOKOGEY ELECTRIC COMPANY.

METHOD OF MAKING SECONDARY-BATTERY PLATES.

SPECIFICATION forming part of Letters Patent No. 432,672, dated July 22, 1890.

Application filed December 28, 1889. Serial No. 335,277. (No model.)

*To all whom it may concern:*

Be it known that I, WILLIAM P. KOOKOGEY, of the city of Brooklyn, county of Kings, and State of New York, have invented a new and useful Method of Making Storage-Battery Plates, of which the following is a specification.

My invention is a new plate for secondary batteries; and it consists, in general, of a pocket or envelope of thin sheet-lead containing active material and having its walls pierced or perforated to allow of circulation in combination with a rigid frame of lead situated within the pocket.

In a prior application made by me for a patent upon a storage-battery plate, Serial No. 235,210, filed September 26, 1889, I have described and claimed a plate in the form of a pocket to hold active material. The present invention is an improvement upon the invention shown in that application in the addition of the rigid frame. Such frame supplies rigidity to the plates, and at the same time its depth serves as a measure for the depth of the active material, so that the active material may be put in without care or skilled labor.

In the accompanying drawings, in which the same letters indicate analogous parts, Figure 1 is a front view of the entire plate with the interior frame shown in dotted lines. Fig. 2 is a front view of the rigid frame slightly modified from the form shown in Fig. 1. Fig. 3 is a sectional view on the line *x x* of Fig. 1.

The plate consists of two thin sheets of lead *b*, which form the outer surface thereof, and which are perforated or punctured throughout their surface, as shown in Fig. 1. The rigid frame of lead *a* is placed between these two thin sheets *b*, the edges corresponding, and the active material is packed or placed within the openings in the frame *a*. The terminal *c* is a part of the frame *a*. The edges of the thin sheets *b* and of the frame *a* may be united to each other in any proper manner—such, for instance, as by making one of the thin sheets *b* larger than the other and folding it over the edge of the frame and of the other sheet in the manner shown in the application above referred to. An improved method consists in burning holes *d* entirely through the two thin sheets of lead and the frame. The fusing of the metal at the points where the holes are burned through serves to make a fast binding and without the introduction of any other metal.

This kind of plate is exceedingly easy to manufacture. One of the thin sheets *b* is laid upon a flat surface, the frame *a* laid upon that, so that the edges meet, and the active material then put in carelessly and smoothed off, the other sheet then placed over the whole, and the holes *d* burned through. In Fig. 1 an additional piece *f* is shown as a part of the frame *a*. Its purpose is simply to increase the rigidity.

I claim as my invention—

The herein-described method of making secondary-battery plates, consisting of placing a rigid frame of conducting material between two sheets of punctured or perforated lead, filling the frame with active material or material to become active, and fastening the sheets and frame together by burning, substantially as described.

In witness whereof I have hereunto set my hand, this 26th day of December, 1889, at the city of New York, in the presence of witnesses.

WM. P. KOOKOGEY.

Witnesses:
 WALTER S. LOGAN,
 SALTER S. CLARK,
 ARTHUR E. WALRADT.